Nov. 19, 1929.                    W. I. O'NEILL                    1,735,872
                              AIRPLANE HELICOPTER
                        Filed May 2, 1928          2 Sheets-Sheet 2
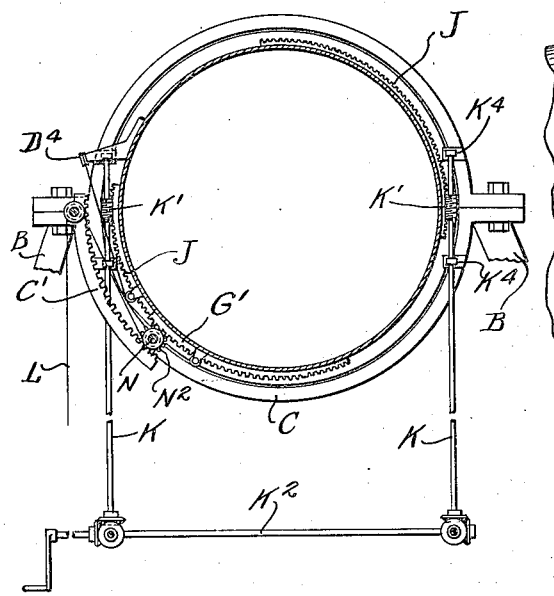
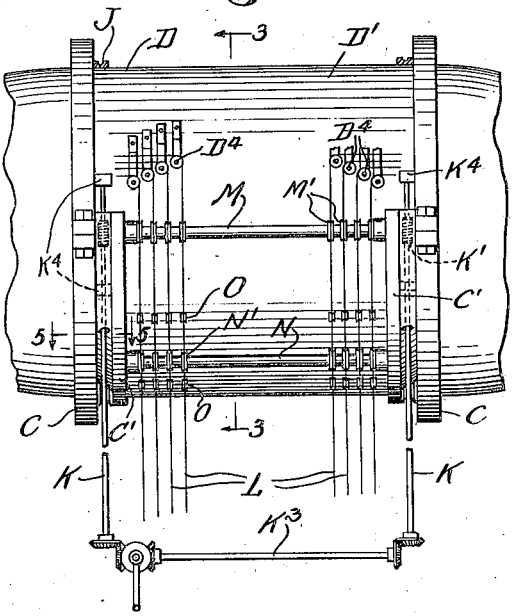
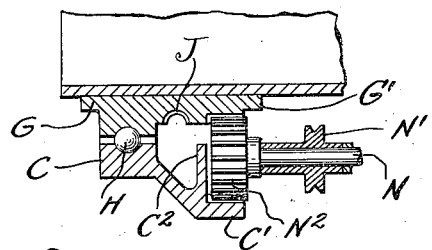
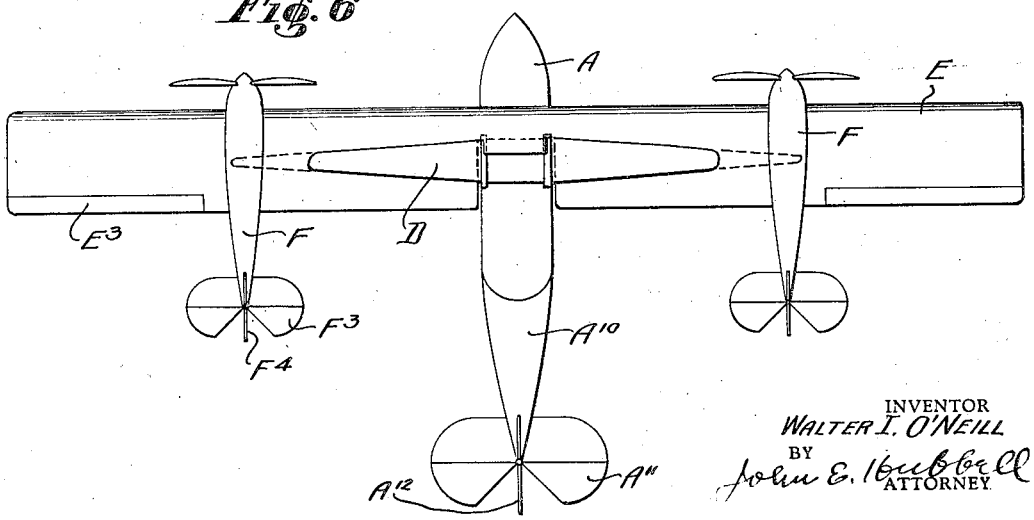
INVENTOR
WALTER I. O'NEILL
BY
John E. Hubbell
ATTORNEY Patented Nov. 19, 1929

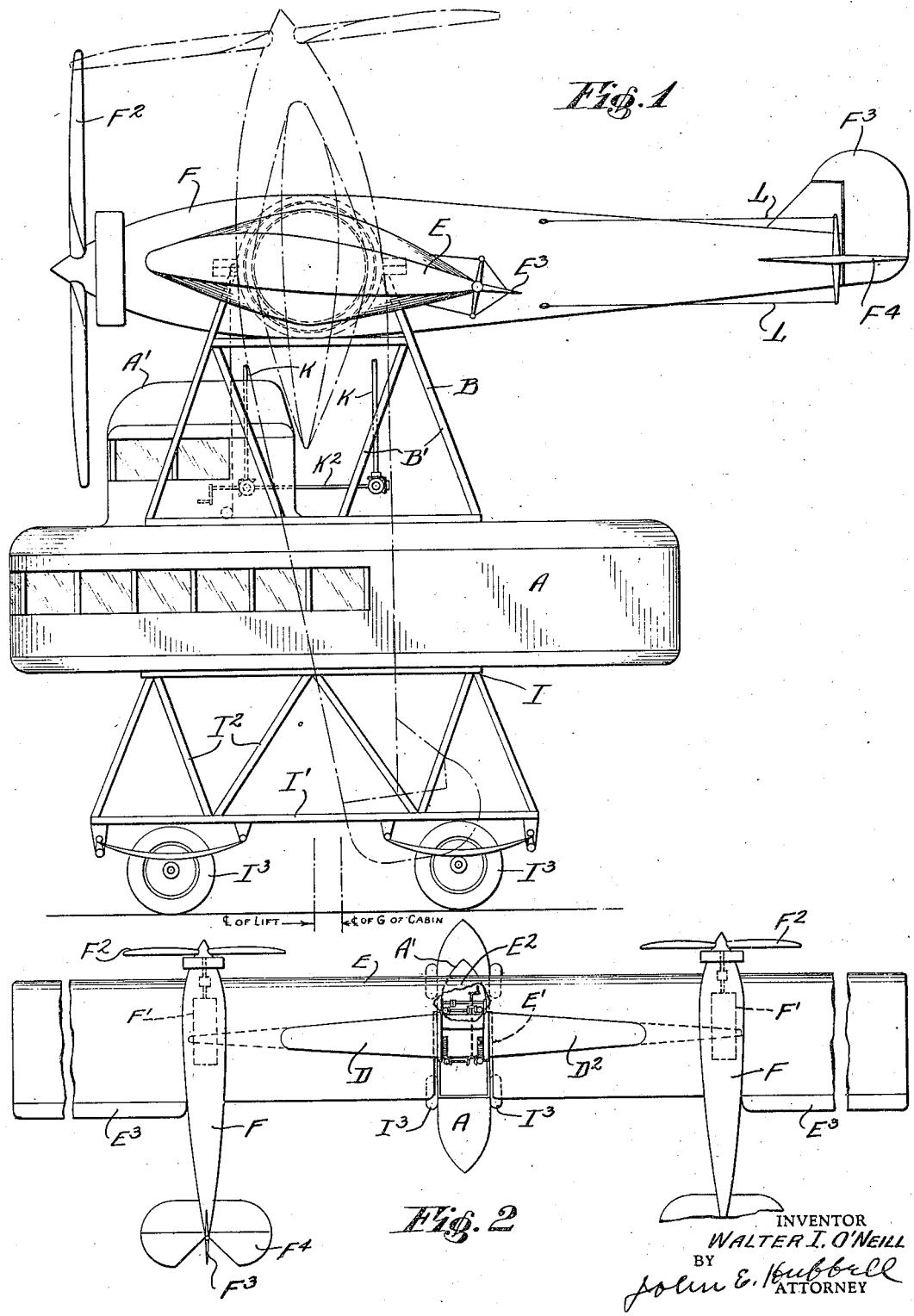

1,735,872

UNITED STATES PATENT OFFICE

WALTER I. O'NEILL, OF NEW YORK, N. Y.

AIRPLANE HELICOPTER

Application filed May 2, 1928. Serial No. 274,387.

The present invention relates to heavier than air flying machines adapted for horizontal or vertical flight. The object of my invention is to provide an improved construction and arrangement of the supporting surfaces and power apparatus of a combined airplane and helicopter having a large load capacity and which is characterized by the low aerofoil resistance when the machine is moving in a vertical direction, the ease of operation and effectiveness of the various control surfaces, and the relative proportioning of the parts whereby the machine can initially rise from and land on the ground in a vertical position without damaging the control surfaces used in vertical flight.

Further objects of my invention are to provide improved provisions for simultaneously varying the position of the main supporting aerofoil and power apparatus relative to a central fuselage containing the pilot and major portion of the load, and provisions for automatically compensating the various control cables extending from the pilot's compartment to the control surfaces and power units during angular movements of the supporting aerofoil relative to the central fuselage.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of the invention.

Of the drawings:

Fig. 1 is a side elevation partly in section of one form of my invention;

Fig. 2 is a plan view;

Fig. 3 is a section on the line 3—3 of Fig. 4 showing the control compensating means;

Fig. 4 is a front view of the apparatus of Fig. 3;

Fig. 5 is a section on the line 5—5 of Fig. 4; and

Fig. 6 is a plan view of a modification.

In the drawings I have shown an embodiment of my improved airplane-helicopter in which a fuselage A tapered at the front and rear is provided with a pilot compartment A' positioned above and adjacent the front of the fuselage. On each side of the fuselage A and suitably secured thereto is a supporting frame B composed of a plurality of inclined struts B'. Each frame supports a vertically positioned circular bearing member C at its upper end.

A tubular member D having a middle portion D' of constant diameter and end portions $D^2$ tapering outwardly is mounted for partial rotation in the circular bearing members C. The tube D, as shown, extends transversely of, and above, the middle portion of the fuselage A.

A supporting aerofoil E having a cross section of the "thick wing" type is rigidly mounted on the tube D. As shown in Figs. 1 and 2, the tube D is built into the aerofoil and has a part of its tapered outer portion $D^2$ projecting slightly above and below the aerofoil surface. The portion of the aerofoil directly above the fuselage A is cut away at points E' so that the aerofoil can be angularly moved relative to the fuselage without interference by the vertical supporting members B. The front portion of the aerofoil extends across the fuselage in a narrow neck $E^2$ so that the aerofoil is preferably built in a single unit. An aileron $E^3$ is mounted on each rear corner of the aerofoil surface.

In the aerofoil surface on each side of the fuselage and equi-distant from the longitudinal center line thereof, is mounted a horizontal body F of aerofoil cross-section in which an internal combustion engine F' is located for driving a propeller $F^2$. The bodies F are incorporated in the aerofoil E and project above and below the aerofoil. The end portions of the tube D terminate in the bodies and form the support therefor. The propellers are arranged for rotation in opposite directions as is customary in the art. Vertical and horizontal rudders $F^3$ and $F^4$, respectively, are mounted on the opposite end of each body F and operate in the slip stream of the propellers during both horizontal and vertical flight.

The fuselage A is provided at its underside with running gear I comprising a framework I' vertically spaced and supported from the fuselage by a plurality of diagonal struts I². The framework I' carries two pairs of resiliently mounted wheels I³ spaced longitudinally along the fuselage.

In the construction shown, the tubular member D is arranged for movement about its longitudinal axis. The provisions by which such movements are accomplished comprise an annular ring G secured to the tube D at each end of the tube portion D'. Bearings H are positioned between the ring G and the corresponding bearing member C. Adjacent each of the rings G are mounted a pair of gear segments J on opposite portions of the tube periphery and each of which extends through a sector of approximately 100°. A pair of vertical shafts K, each of which has a worm gear K' adjacent the upper end thereof, is mounted on each side of the fuselage and arranged to engage the gear segments J. A drive shaft K² manually operated, is operatively connected to one pair of vertical shafts K. The other pair of vertical shafts is operatively connected to the drive shaft by gearing carried by transverse shafts K³. Thrust bearings K⁴ are mounted on each shaft K adjacent the worm K'. With the above provisions the tube D carrying the main aerofoil and power units may be manually turned relative to the central fuselage A.

The combined airplane-helicopter heretofore described, is operated and controlled from the pilot's compartment of the fuselage A. The various control cables L leading to the ailerons, horizontal and vertical rudders and engine fuel control devices lead to this compartment. When the aerofoil and power units are turned toward the vertical position, compensating means are supplied for maintaining a uniform tension on the various control cables.

My improved compensating provisions comprise a shaft M carrying a plurality of pulleys M' at each end thereof journalled in a portion of the supporting frame of the tubes D and arranged to guide the various control cables L towards a second set of pulleys N' mounted on a shaft N. The shaft N is provided with a spur gear N² at each end thereof. Each gear N² is positioned between a toothed portion G' of the annular ring G and a gear segment C' formed on an extension of the bearing member C. Each member C is formed with a projecting wall C² for preventing lateral movement of the corresponding gear N². As shown in Fig. 3, the gear segments G' and C' extend through a sector of approximately 60° on the tube circumference. The spur gears N² and shaft N in Figs. 3 and 4, are shown in the position for horizontal flight. Each control cable L passes vertically upward to and around a corresponding pulley M' from which it passes down to and around a corresponding pulley N' on the shaft N. Each cable is then directed upwardly to a corresponding pulley D⁴ mounted on the tube periphery and from which it is led to the element to be controlled. Intermediate pulleys O are mounted on the tube surface for directing the control cables.

With the apparatus constructed as described, on an angular movement of the aerofoil and power units toward the vertical, each gear segment G' is rotated through a corresponding angle. This movement of the gear segments rotates the corresponding spur gears N² and causes the latter to travel upwardly on the gear C' thereby displacing the shaft N and pulleys N' vertically. The shaft N and gear N² are moved half the angular distance that the tube is turned. The movements of the shaft N on the stationary gear C' are so proportioned that a uniform tension is maintained on all the control cables carried thereby during angular movements of the aerofoil structure.

The airplane-helicopter of my invention is particularly characerized by the ease in which the position of the various parts may be changed from horizontal to vertical flight or vice versa. The machine shown has a large load capacity and the principal portion of the load is preferably contained within the fuselage A. The various parts to be moved from one angular position to another can therefore be made relatively light in weight and may be manually operated effectively. The aerofoil bodies F, the framework B, and the running gear I, are so proportioned that the machine may rise and land with the aerofoil bodies in the vertical position without damaging the control surfaces on the bodies F.

In the modification illustrated in Fig. 6, the aerofoil bodies F are shortened in length to decrease the overall height of the machine. In the modified form shown, the fuselage A is provided with an empennage structure A¹⁰ carrying horizontal and vertical control surfaces A¹¹ and A¹², respectively. These control surfaces are normally not operated during vertical movements of the machine but are utilized during horizontal flight only. The compensating provisions described insure an effective control of the machine at all times.

While in the preferred embodiment of my invention heretofore described, I have illustrated the supporting aerofoil as being bodily movable as a unit, it is possible to arrange the structure with only the portion of the aerofoil immediately around the aerofoil bodies F movable. For example, the structure shown in Fig. 2 can be modified by moving the aerofoil bodies F closer to the fuselage and making the portion of the aerofoil between the fuselage and including the aerofoil bodies F angularly movable. In such a construction the outer ends of the aerofoil carrying the ailerons E³ are fixed in position.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:—

1. A combined airplane-helicopter comprising a central fuselage, a tubular member having tapered end portions extending transversely of said fuselage beyond the sides thereof and arranged for angular movement about its longitudinal axis, a supporting aerofoil rigidly mounted on said tubular member and having surface portions directly above said fuselage, an aerofoil body extending transversely of and rigidly connected to said first mentioned aerofoil at each side of said fuselage, a power generating unit in said aerofoil body, and means for moving said aerofoil and aerofoil body from a position for horizontal flight to a position for vertical flight.

2. A combined airplane-helicopter comprising a central fuselage having landing gear secured to the underside thereof, a tubular member extending transversely of said fuselage and arranged for angular movement about its longitudinal axis, a supporting aerofoil rigidly mounted on said tubular member, the front of the portion of said aerofoil directly above said fuselage being continuous and the rear portion cut away, an aerofoil body extending transversely of said first mentioned aerofoil at each side of said fuselage, a power generating unit in each aerofoil body, horizontal and vertical rudders on the rear end of said bodies, and means for moving said aerofoil and aerofoil bodies from a position for horizontal flight to a position for vertical flight, said aerofoil, fuselage and aerofoil bodies being so proportioned that said bodies may be maintained in the position for vertical flight while the machine is landing.

3. A combined airplane-helicoper comprising a central fuselage, a vertical supporting frame on each side of said fuselage, a circular bearing member supported in each of said frames, a tubular member having a central portion mounted in said bearing members and projecting tapered end portions, a supporting aerofoil rigidly connected to said tubular member, an aerofoil body incorporated in said aerofoil on each side of said fuselage and equi-distant therefrom, said aerofoil bodies being supported on the ends of said tubular member, a power generating unit in each of said bodies, a propeller operatively connected to each power unit, horizontal and vertical rudders on the rear end of each aerofoil body, a pair of gear segments secured to said tubular member, and means operatively connected to said gear segments for angularly moving said aerofoil and aerofoil bodies.

4. A combined airplane-helicopter comprising a central fuselage having tapered end portions, a pilot compartment mounted on the front end of said fuselage, a vertical supporting frame on each side of said fuselage, a circular bearing member supported in each of said frames, a tubular member having a central cylindrical portion mounted in said bearing members and projecting tapered end portions, a pair of gear segments secured to said tubular member, a supporting aerofoil rigidly connected to said tubular member and having cut-away portions adjacent said bearing members, an aerofoil body incorporated in said aerofoil on each side of said fuselage and equi-distant therefrom, said aerofoil bodies being supported on the ends of said tubular member, a power generating unit in each of said bodies, a propeller operatively connected to each power unit, horizontal and vertical rudders on the rear end of each aerofoil body, and means in said pilot compartment operatively connected to said gear segments for angularly moving said aerofoil and aerofoil bodies.

5. A combined airplane-helicopter comprising a central fuselage having tapered end portions, a pilot compartment mounted on the front end of said fuselage, a vertical supporting frame on each side of said fuselage, a circular bearing member supported in each of said frames, a tubular member having a central cylindrical portion mounted in said bearing members and projecting tapered end portions, a pair of gear segments secured to the periphery of said tubular member adjacent each bearing member, a supporting aerofoil rigidly connected to said tubular member and having cut-away portions adjacent said bearing members, an aerofoil body incorporated in said aerofoil on each side of said fuselage and equi-distant therefrom, said aerofoil bodies being supported on the ends of said tubular member, a power generating unit in each of said bodies, a propeller operatively connected to each power unit, horizontal and vertical rudders on the rear end of each aerofoil body, and means in said pilot compartment operatively connected to said gear segments for angularly moving said aerofoil and aerofoil bodies, said means comprising a pair of vertical shafts at each side of said fuselage, a worm gear on each of said shafts engaging a corresponding gear segment, and means for simultaneously operating all of said vertical shafts.

6. A combined airplane-helicopter comprising a central fuselage, a tubular member extending transversely of said fuselage and arranged for angular movement about its longitudinal axis, a supporting aerofoil rigidly mounted on said tubular member, an aerofoil body extending transversely of said supporting aerofoil, control surfaces mounted on the rear of said body, operating cables from said fuselage leading to said control surfaces, means for angularly moving said supporting aerofoil and aerofoil body, and compensating means engaging said control cables for maintaining a uniform tension on said cables during angular movements of said aerofoil.

7. A combined airplane-helicopter comprising a central fuselage, a tubular member extending transversely of said fuselage and arranged for angular movement about its horizontal axis, a supporting aerofoil rigidly mounted on said tubular member, an aerofoil body extending transversely of said supporting aerofoil, control surfaces mounted on said body, operating cables from said fuselage leading to said control surfaces, means for angularly moving said supporting aerofoil and aerofoil body, and compensating means engaging said control cables for maintaining a uniform tension on said cables during angular movements of said aerofoil, said last mentioned means comprising a pulley shaft around which said cables are passed, a spur gear at each end of said shaft and segmental gears on the periphery of said tubular member engaging said spur gears.

8. A combined airplane-helicopter comprising a central fuselage, a tubular member extending transversely of said fuselage and arranged for angular movement about its horizontal axis, a supporting aerofoil rigidly mounted on said tubular member, an aerofoil body extending transversely of said supporting aerofoil, control surfaces mounted on said body, operating cables from said fuselage leading to said control surfaces, means for angularly moving said tubular member, supporting aerofoil and aerofoil body, and compensating means engaging said control cables for maintaining a uniform tension on said cables during angular movements of said aerofoil, said last mentioned means comprising segmental gears rigidly connected to said fuselage, a spur gear on each end of said pulley shaft engaging one of said gears, a second pair of segmental gears mounted on said tubular member and engaging said spur gears, whereby said pulley shaft is moved through half the angular distance through which said tubular member is rotated.

Signed at New York city, in the county of New York and State of New York, this 26th day of April, A. D. 1928.

WALTER I. O'NEILL.